United States Patent
Clark et al.

(10) Patent No.: US 12,027,100 B2
(45) Date of Patent: Jul. 2, 2024

(54) SETTING ADJUSTMENTS BASED ON RADAR

(71) Applicant: Hewlett-Packard Development Company, L.P., Spring, TX (US)

(72) Inventors: Alexander Wayne Clark, Spring, TX (US); Hui Leng Lim, Spring, TX (US); Chi So, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 124 days.

(21) Appl. No.: 17/419,771

(22) PCT Filed: Jul. 26, 2019

(86) PCT No.: PCT/US2019/043619
§ 371 (c)(1),
(2) Date: Jun. 30, 2021

(87) PCT Pub. No.: WO2021/021074
PCT Pub. Date: Feb. 4, 2021

(65) Prior Publication Data
US 2022/0148490 A1    May 12, 2022

(51) Int. Cl.
*G06T 3/40* (2024.01)
*G06F 3/16* (2006.01)
*G06T 7/70* (2017.01)
*G09G 3/20* (2006.01)

(52) U.S. Cl.
CPC ......... *G09G 3/2096* (2013.01); *G06F 3/165* (2013.01); *G06T 3/40* (2013.01); *G06T 7/70* (2017.01); *G06T 2207/10044* (2013.01); *G09G 2320/08* (2013.01); *G09G 2340/04* (2013.01); *G09G 2354/00* (2013.01)

(58) Field of Classification Search
None
See application file for complete search history.

(56) References Cited

U.S. PATENT DOCUMENTS

| | | |
|---|---|---|
| 6,931,596 B2 | 8/2005 | Gutta et al. |
| 2006/0176259 A1 | 8/2006 | Yamada |
| 2006/0192775 A1 | 8/2006 | Nicholson et al. |
| 2012/0092172 A1* | 4/2012 | Wong .................. G08B 21/06 340/575 |
| 2012/0166985 A1* | 6/2012 | Friend .................. G06F 9/454 715/765 |
| 2012/0287035 A1 | 11/2012 | Valko et al. |

(Continued)

FOREIGN PATENT DOCUMENTS

| | | |
|---|---|---|
| GB | 2467898 A | 8/2010 |
| JP | 2006-267323 A | 10/2006 |

(Continued)

*Primary Examiner* — Joni Hsu
(74) *Attorney, Agent, or Firm* — Quarles & Brady LLP

(57) ABSTRACT

In example implementations, an apparatus is provided. The apparatus includes an output device, a radar, a memory, and a processor in communication with the output device, the radar, and the memory. The radar is to collect position data of a user relative to the apparatus. The memory is to store a threshold. The processor is to determine if the position data of the user exceeds the threshold and to adjust a setting of the output device in response to the position data of the user determined to exceed the threshold.

20 Claims, 5 Drawing Sheets

(56) References Cited

U.S. PATENT DOCUMENTS

| | | | |
|---|---|---|---|
| 2013/0094668 A1* | 4/2013 | Poulsen | H03G 3/301 |
| | | | 381/107 |
| 2013/0257849 A1* | 10/2013 | Doherty | H04N 13/332 |
| | | | 345/419 |
| 2014/0354535 A1* | 12/2014 | Chen | G09G 5/00 |
| | | | 345/156 |
| 2016/0246364 A1* | 8/2016 | Miller | G09G 5/00 |
| 2017/0160393 A1* | 6/2017 | Gatland | G01S 7/6281 |
| 2017/0249122 A1 | 8/2017 | Pance et al. | |
| 2017/0277506 A1 | 9/2017 | Vanblon et al. | |
| 2019/0107602 A1* | 4/2019 | Kitamura | G06N 20/00 |

FOREIGN PATENT DOCUMENTS

| | | |
|---|---|---|
| TW | 486577 | 5/2002 |
| TW | I561841 | 12/2016 |

\* cited by examiner

SETTING ADJUSTMENTS BASED ON RADAR

BACKGROUND

Individuals use computing devices to perform various functions or to consume different types of media. A computing device may be associated with different display sizes and/or sound capabilities. For example, some users may sit close to a large display and watch a movie, while other users may sit relatively far away from a display and read electronic documents.

DETAILED DESCRIPTION

Examples described herein provide an apparatus and method to adjust settings of a device based on data collected from a radar. As noted above, users may use computing devices of different sizes and sound capabilities to consume media or execute applications. However, the computing devices may be complicated, and some users may not know how to adjust certain settings of the computing devices.

In some examples, the user may be too lazy to adjust the settings of the computing device. This can lead to the user leaning too far in to read text shown on a display or to hear audio emitted by the computing device. Leaning forward too much can cause health problems related to poor posture.

Examples herein provide a device with radar to detect a position of a user relative to the computing device or particular components of the computing device. For example, the radar may detect how far or how close the user is with respect to the computing device, or if the user is leaning towards the speakers.

Based on the position of the user, the computing device may automatically adjust device settings. For example, if the user is leaning too close to the display, the computing device may enlarge the font size of the electronic document. In another example, if the user is leaning towards the speakers, the computing device may increase the volume. The computing device may adjust device settings until the user moves back into a relaxed position (e.g., a default distance or body position relative to the computing device).

In one example, the computing device may learn the relaxed position of the user and adjust device settings to try and keep the user in the relaxed position. Different user profiles may be associated with different users who may share the computing device. The relaxed position may be different for the different users. Thus, the device settings may be adjusted differently for different users based on the body positions detected by the radar.

Figure 1:
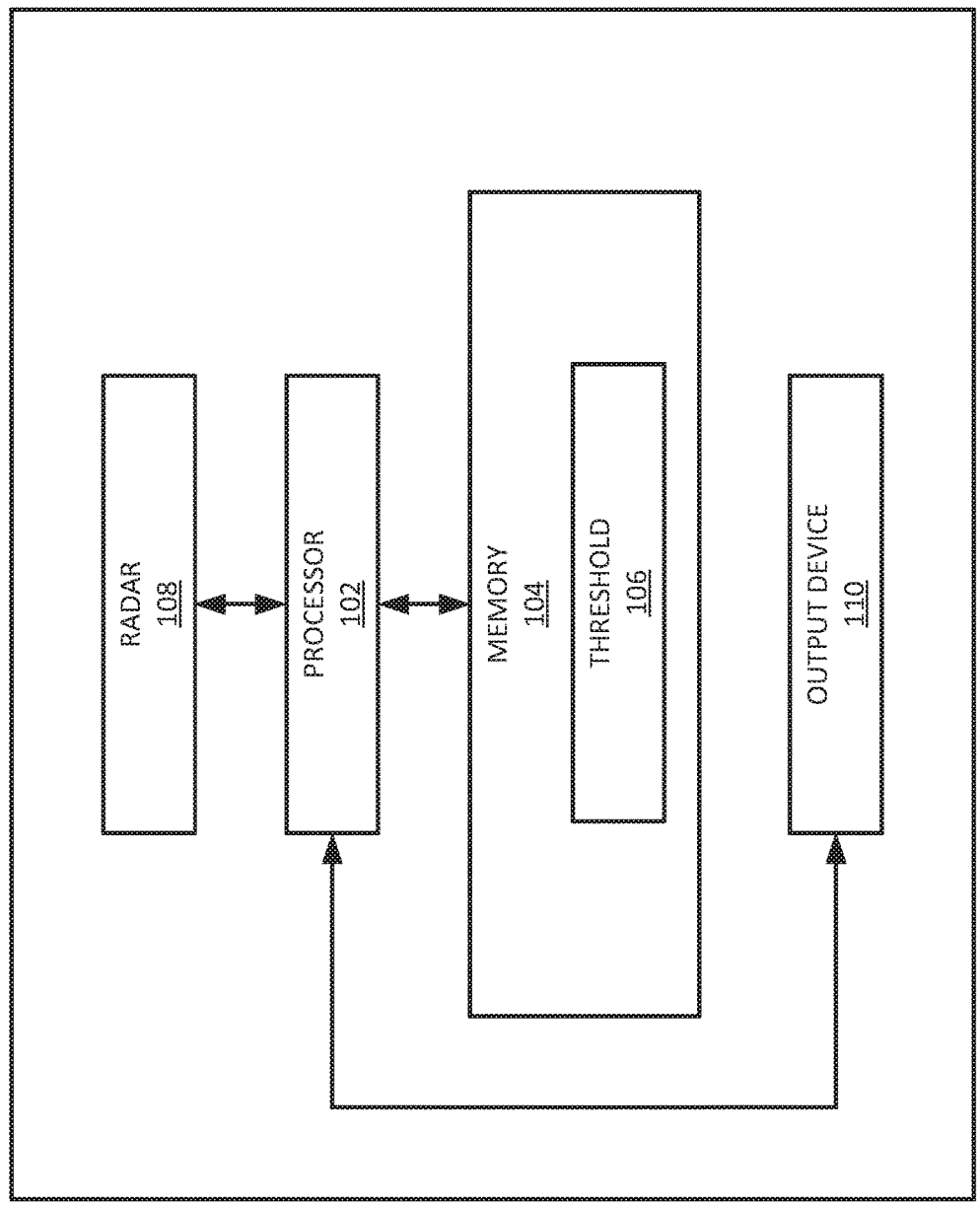
FIG. 1 is a block diagram of an example apparatus with radar consistent with the present disclosure.

FIG. 1 illustrates an example apparatus 100 of the present disclosure. In an example, the apparatus 100 may be a computing device such as a desktop computer, a laptop computer, a tablet computer, and the like.

In an example, the apparatus 100 may include a processor 102, a memory 104, a radar 108, and an output device 110. In an example, the processor 102 may be communicatively coupled to the memory 104, the radar 108, and the output device 110. The processor 102 may control operation of the radar 108 and the output device 110. The processor 102 may also execute instructions stored in the memory 104 to perform the functions described herein.

In an example, the memory 104 may be a non-transitory computer readable medium. For example, the memory 104 may be a hard disk drive, a solid state drive, a random access memory (RAM), a read only memory (ROM), and the like. The memory 104 may include multiple memory devices (e.g., a hard disk drive and RAM).

In an example, the memory 104 may store thresholds 106. The thresholds 106 may be values that can be used to determine whether users are sitting too close to or too far from the apparatus 100. If a threshold 106 is breached, the processor 102 may automatically adjust a setting of the output device 110.

In an example, the thresholds 106 may be particular body positions. In an example, ae body position may be a distance from the apparatus 100. In an example, the body position may be a distance and a direction towards a particular output device. For example, if the user is leaning towards a particular output device 110 and within a distance threshold 106, the processor 102 may adjust a setting of the output device 110. The distance and the position of the user may be determined based on position data collected by the radar 108, as discussed in further details below.

In an example, the threshold 106 may be pre-defined. For example, the apparatus 100 may be shipped with a threshold value of an average distance that a user sits from the apparatus 100 or an average posture or position of a user. As the apparatus 100 is used by a particular user, the threshold 106 may be dynamically updated over time. For example, the apparatus 100 may display confirmation requests as settings of the output device 110 are adjusted.

In an example, if multiple users share the apparatus 100, the memory 104 may store different thresholds 106 for different users. For example, values of the threshold 106 may change based on who is logged into the apparatus 100 at a particular time. In other words, the memory 104 may store different user profiles that are associated with different thresholds 106 for each one of the plurality of user profiles.

In an example, the output device 110 may be monitor, a display, a speaker, and the like. The output device 110 may have settings that can be adjusted. For example, a monitor may adjust a zoom percentage to make the images larger or smaller, adjust a font size of text that is displayed to be larger or smaller, adjust a brightness level, and the like. The speaker may have settings that can adjust a volume level to be louder or quieter.

As discussed above, some users may not know how to adjust settings of the output device 110 or may be too lazy to adjust the settings. The present disclosure may automatically collect position data of a user sitting in front of the apparatus 100. Based on the position data, the apparatus 100 may automatically adjust the settings of the output device 110 until the user is in a "relaxed position". The "relaxed position" may be set when the apparatus 100 is initialized by the user. The "relaxed position" may be a distance window where the user is not too far from the apparatus 100 and not too close to the apparatus 100. For example, the "relaxed position" may be a distance window of approximately 2-3 feet.

In an example, the "relaxed position" may also be a posture or position of the user. For example, the settings may be automatically adjusted until the user is sitting upright (e.g., not leaning forward or leaning back) and centered to the apparatus 100 (e.g., not leaning to the right or left towards a speaker).

The distances and positions associated with the "relaxed position" may be store as the threshold 106 for a particular user. Thus, when a user deviates from the "relaxed position," the processor 102 may automatically adjust settings of the output device 110 until the user returns to the "relaxed position".

In one example, the radar 108 may collect the position data of the user. The radar 108 may be a millimeter wave detection device that can emit a radio frequency (RF) signal and measure a response of the RF signal that is returned after bouncing off an object. Although a millimeter wave detection device is used, other types of radar devices may also be implemented such as a light wave detection device or Lidar.

The radar 108 may transmit multiple RF signals that collect a plurality of position data points for each user in a room. The radar 108 may collect position data along a 180 degree span. The data collected by the radar 108 may include a distance from the radar 108 or apparatus 100, an angle at which a user is sitting relative to the apparatus 100, a motion vector of the user, a direction of the user relative to the apparatus 100, and the like.

Figure 3:
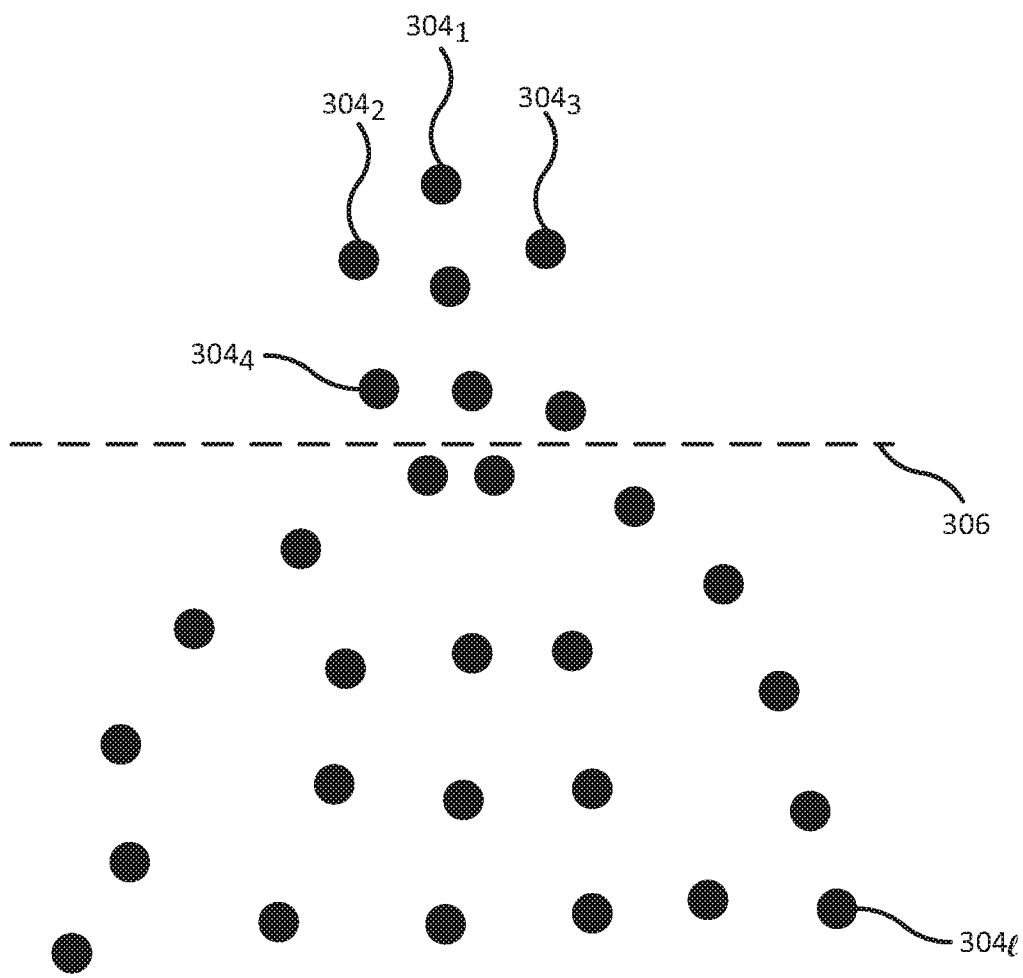
FIG. 3 is a block diagram of an example of a radar image consistent with the present disclosure.

An example of a radar image 302 is illustrated in FIG. 3. As noted above, the radar 108 may transmit multiple RF signals that collect a plurality of position data points $304_1$ to $304_I$ (hereinafter also referred to individually as a position data point 304 or collectively as position data points 304). In one example, the position of a user may be determined based on an average of the position data points 304. For example, the distance of a user from the radar 108 or the apparatus 100 may be an average of the distance of each one of the position data points 304.

In an example, a position or posture of a user may be determined based on a shape of the position data points 304. For example, the position data points 304 above a line 306 may represent a head of a user. The position data points 304 below the line 306 may represent a torso of the user. Thus, the position or posture of the user may be determined based on estimated positions of the user's head and torso.

For example, a certain arrangement of the position data points 304 may indicate the head of the user is turned in a particular direction towards a speaker or closer to a display. A certain arrangement of the position data points 304 may indicate that the torso of the user is leaning away from the apparatus 100 because the images are too large, or is turned in a particular direction.

The angle of the user relative to the apparatus 100 may also be estimated based on the arrangement of the position data points 304. For example, when the user is facing the apparatus 100 directly (e.g., associated with 0 degrees relative to the apparatus 100), the arrangement of the data points 304 may have a maximum width. As the user turns his or her torso to the left or the right, the torso may appear narrower. When the user is turned side-ways relative to the apparatus 100 (e.g., associated with 90 degrees), the arrangement of data points 304 may have a minimum width. When the user is at 45 degrees, the arrangement of data points 304 may have a width that is between the maximum width and the minimum width.

The processor 102 may calculate the distance of the user and/or position of the user based on the position data points 304 measured by the radar 108. The distance may be compared to the threshold 106 to determine if an adjustment to a setting of the output device 110 should be made.

In one example, the threshold 106 may also be associated with different directions and output devices 110. For example, if the speakers are set up to the left and right of a display, one threshold 106 may be associated when the user's head is pointed towards one of the speakers (e.g., head is angled at 45 degrees towards a speaker, the head is bending down, and the head is less than a distance threshold). When the distance of the head is less than the threshold 106, pointed towards the speaker, and leaning down or forward, the processor 102 may determine that the user cannot hear the audio. As a result, the processor 102 may automatically increase a volume setting of the speakers.

The position data points 304 may be continuously tracked over time. For example, after the adjustments are made, the position data points 304 may indicate that the user is now further away and leaning away from the speakers. The threshold 106 may include a second distance threshold for the speaker to lower the volume (e.g., when the distance threshold is exceeded). The processor 102 may determine that, based on the position data points 304, the volume is too loud. As a result, the processor 102 may automatically adjust a volume setting of the speaker to be lower.

After the adjustment is made, the position data points 304 may indicate that the user is back in the "relaxed position". As a result, the processor 102 may maintain the settings of the output devices 110 at current settings. In one example, the processor 102 may generate a prompt to ask the user to confirm that the settings of the output devices 110 are acceptable.

In one example, the thresholds 106 may be adjusted dynamically based on observed interactions of the user with the output devices 110. For example, a user may like louder sound. As a result, even in a "relaxed position" the user may increase a volume setting of the speaker. Thus, the processor 102 may adjust the threshold 106 and associated settings for the user.

In another example, the processor 102 may increase a zoom percentage to 125% when the user is at a distance less than a threshold 106 to the display. However, the user may like a particular zoom percentage when moved closer to the display (e.g., 150% zoom). Thus, the processor 102 may adjust the zoom percentage to 150% when the user is at a distance less than the threshold 106 rather than adjusting the zoom percentage by a default 125%.

Figure 2:
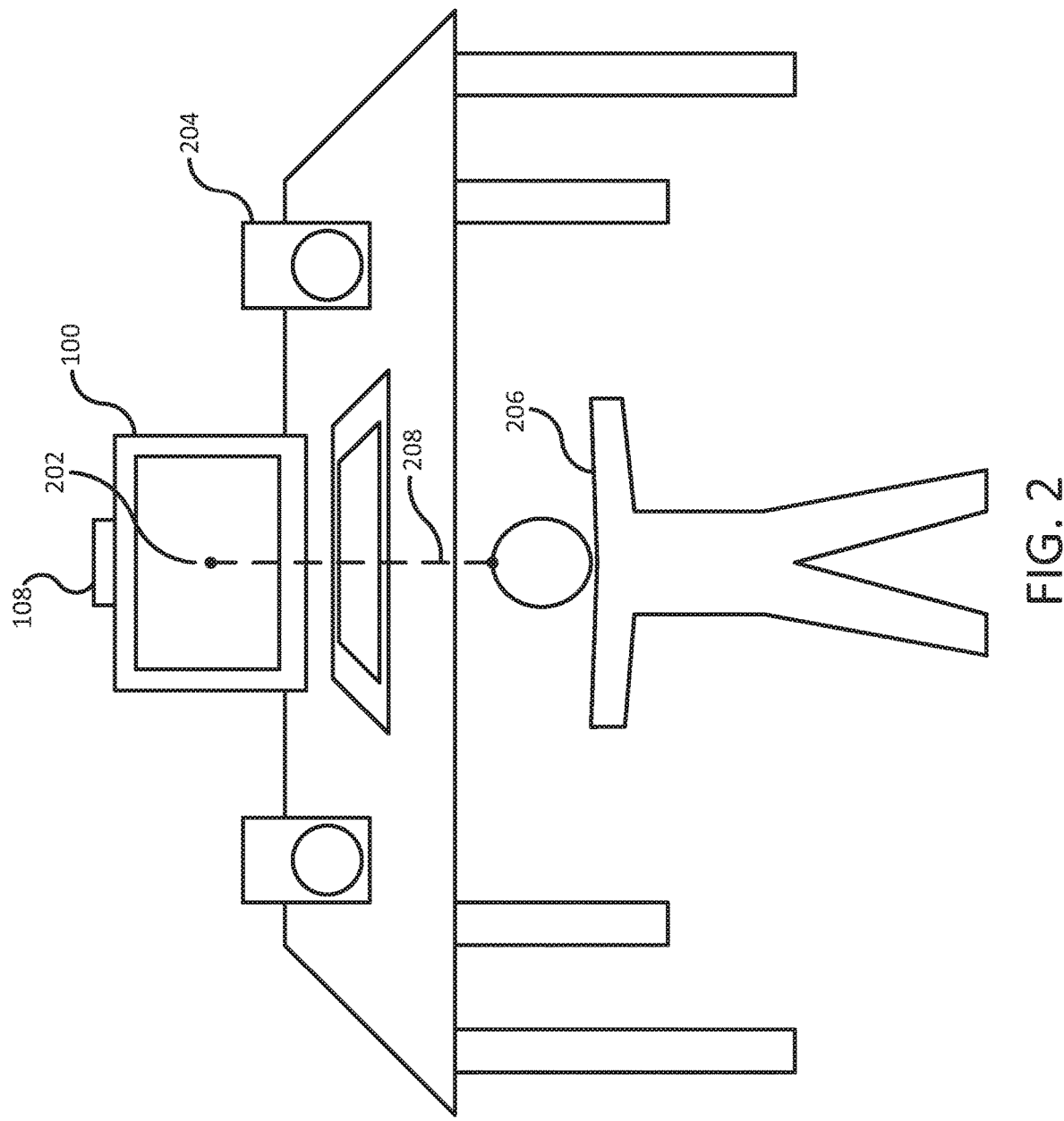
FIG. 2 is a block diagram of an example apparatus in operation with a user consistent with the present disclosure.

FIG. 2 illustrates an example of the apparatus 100 in operation with a user 206. The apparatus 100 may be positioned in front of the user 206. The apparatus 100 may include the radar 108, a monitor 202 and speakers 204. The monitor 202 and the speakers 204 may be examples of the output device 110 illustrated in FIG. 1, and described above.

In an example, the radar 108 may be positioned towards a top of the monitor 202 and may collect position data of the user 206. The user 206 may sit in front of the apparatus 100. As noted above, the user 206 may interact with the apparatus 100 when initially powered on to set a "relaxed position" and the associated thresholds 106.

For example, the apparatus 100 may prompt various questions on the monitor 202 that the user 206 may answer. For example, the user 206 may be asked to sit at a desired distance and posture from the apparatus 100. The radar 108 may collect position data of the user 206.

The apparatus 100 may then cycle through various volume levels of the speakers 204 and zoom settings of images on the monitor 202. The user 206 may select the desired volume level and zoom level in the "relaxed position". The selected volume and zoom levels may be a default setting when the user 206 is in the "relaxed position". Distance thresholds 106 for the apparatus 100 or specific devices such as the monitor 202 and speaker 204 may be stored in the memory 104.

After the "relaxed position" is defined, the user 206 may interact with the apparatus 100. For example, the user 206 may begin watching a video on the apparatus 100. The radar 108 may collect position information of the user 206 continuously or periodically (e.g., every 30 seconds, every minute, and the like).

The processor 102 may calculate a distance of the user 206 from the apparatus 100 as shown by a line 208, a direction in which the user 206 is facing, an angle of the user relative to the apparatus (e.g., relative to the line 208 as 0 degrees), and the like. The processor 102 may compare the distance of the user 206 and other position information collected by the radar 108 to the threshold 106.

If the distance and/or direction of the user 206 falls outside of a distance window associated with the "relaxed position," the apparatus 100 may automatically adjust a setting of the monitor 202 and/or the speakers 204. In some examples, a single setting may be changed (e.g., the volume of the speakers). In other examples, a plurality of different settings of different output devices may be changed. For example, the zoom amount of the monitor 202 and the volume of the speakers 204 may both be adjusted. The apparatus 100 may continue to collect position information via the radar 108, compare the position information to the threshold 106, and adjust a setting of the monitor 202 and/or speakers 204 to try to keep the user 206 in the "relaxed position".

In an example, the user 206 may manually change a setting after the setting is changed automatically by the processor 102. The processor 102 may learn new preferences of the user 206 and update the distance threshold 106 and associated settings based on the manual changes made by the user 206. In one example, the apparatus 100 may display a message on the monitor 202 to have the user confirm the manual change. For example, the message may ask if the user would like to associate the new setting of the monitor 202 and/or speaker 204 with the associated distance threshold 106.

Thus, the apparatus 100 may automatically adjust a setting of an output device 110 based on position data of a user collected by the radar 108. Thus, even if the user is not aware that they are moving closer to a monitor or speakers, the apparatus 100 may detect this movement and adjust the settings of the monitor or speakers so that the user can move back into a "relaxed position". Thus, the apparatus 100 may provide a more comfortable user experience. The apparatus may also improve posture and health by preventing the user from slouching, preventing the user from squinting to read text that is too small, and the like.

Figure 4:
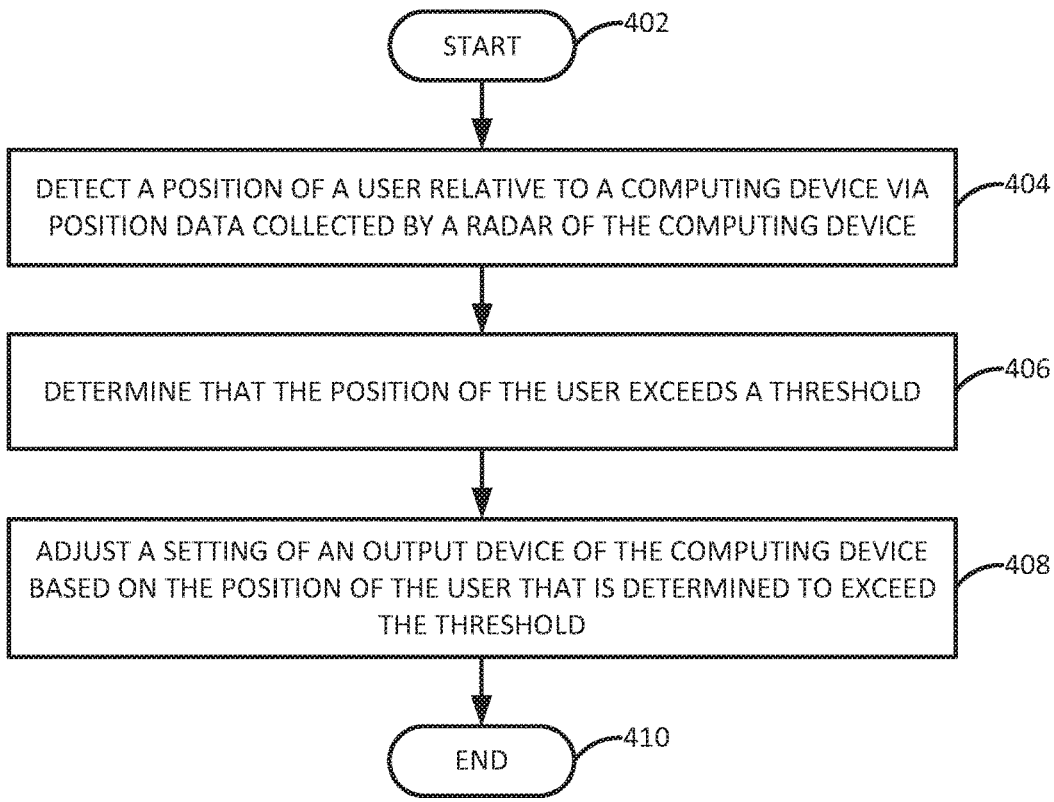
FIG. 4 is a flow chart of an example method for adjusting settings of a device based on data collected from a radar consistent with the present disclosure.

FIG. 4 illustrates a flow chart of an example method 400 for adjusting settings of a device based on data collected from a radar of the present disclosure. In an example, the method 400 may be performed by the apparatus 100 or the apparatus 500 illustrated in FIG. 5, and discussed below.

At block 402, the method 400 begins. At block 404, the method 400 detects a position of a user relative to a computing device via position data collected by a radar of the computing device. For example, radar data may be collected by a radar coupled to an apparatus or computing device. The radar may be a millimeter wave detection device that emits RF signals towards an object and collects position data based on the return RF signal. The position data may include an angle at which a user is sitting relative to the apparatus, a distance from the device, a motion vector of the user, a direction of the user relative to the apparatus, and the like.

In an example, the radar data may include a plurality of position data points for the user. Some of the position data may be an average value of the position data points. For example, the distance of the user may be based on an average distance of each position data point of the user. Some of the position data may be obtained based on an arrangement of the position data points. For example, a width of the position data points may be correlated to an angle of the user relative to the apparatus or a shape of the position data points may indicate a posture, a direction in which the user is leaning, and the like.

At block 406, the method 400 determines that the position of the user exceeds a threshold. For example, the threshold may be a distance value relative to the apparatus. In an example, the threshold may include a distance value and a direction relative to a particular output device. For example, one threshold may include a distance and direction for a speaker and another threshold may include a distance and direction for a monitor. Thus, based on the direction in which the user is leaning, the settings for the appropriate output device can be adjusted.

In an example, the threshold may be a distance window that is associated with a "relaxed position". For example, the "relaxed position" may be defined by a user when the apparatus is initialized. The distance window may include a first threshold that indicates that the user is too close to the apparatus and a second threshold that indicates that the user is too far from the apparatus.

At block 408, the method 400 adjusts a setting of an output device of the computing device based on the position of the user that is determined to exceed the threshold. For example, if the threshold is exceeded, then the user may be too close to or too far from the output device. The setting of the output device may be adjusted accordingly. For example, if the user is too close to the output device, the setting may be adjusted to increase a volume or increase a zoom percentage to make images or text larger. If the user is too far from the output device, the setting may be adjusted to decrease the volume or reduce a zoom percentage to make images or text smaller.

In one example, the blocks 404, 406, and 408 may be continuously repeated. Thus, if the threshold is a distance window, the method 400 may continuously adjust settings of the output device to try and keep the user within the distance threshold (e.g., the user is in the "relaxed position" and not too far or too close to the apparatus). At block 410, the method 400 ends.

Figure 5:
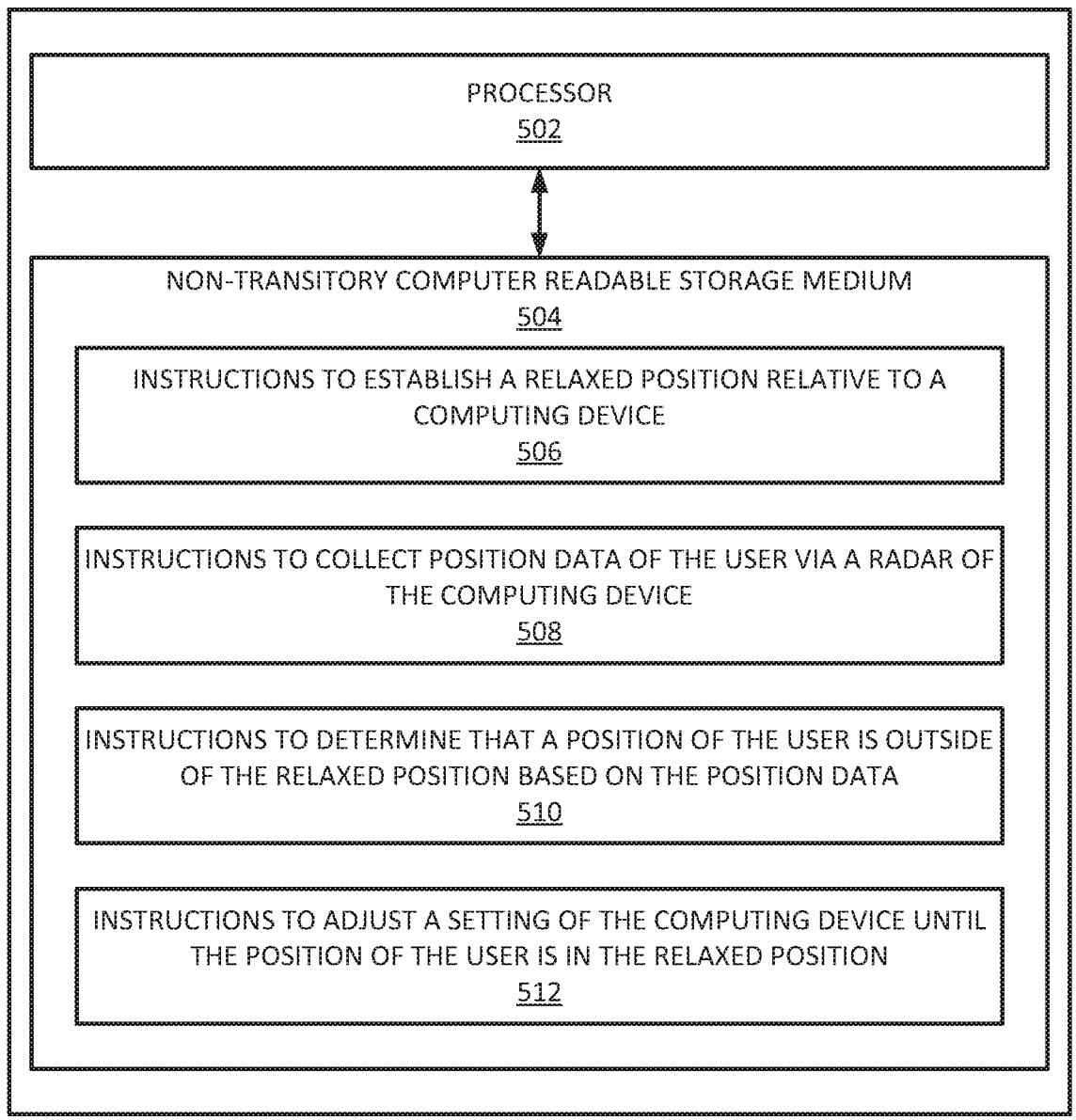
FIG. 5 is a block diagram of an example non-transitory computer readable storage medium storing instructions executed by a processor to adjust settings of a device based on data collected from a radar consistent with the present disclosure.

FIG. 5 illustrates an example of an apparatus 500. In an example, the apparatus 500 may be the apparatus 100. In an example, the apparatus 500 may include a processor 502 and a non-transitory computer readable storage medium 504. The non-transitory computer readable storage medium 504 may include instructions 506, 508, 510, and 512 that, when executed by the processor 502, cause the processor 502 to perform various functions.

In an example, the instructions 506 may include instructions to establish a relaxed position relative to a computing device. The instructions 508 may include instructions to collect position data of the user via a radar of the computing device. The instructions 510 may include instructions to determine that a position of the user is outside of the relaxed position based on the position data. The instructions 512 may include instructions to adjust a setting of the computing device until the position of the user is in the relaxed position.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

We claim:

1. An apparatus, comprising:
    an output device;
    a radar to collect position data of a user relative to the apparatus;
    a memory to store a threshold; and
    a processor in communication with the output device, the radar, and the memory, wherein the processor is to:
        determine if the position data of the user exceeds the threshold;
        adjust a setting of the output device in response to the position data of the user determined to exceed the threshold; and
        continue to determine if the position data exceeds the threshold and adjust the setting of the output device until a position of the user is within a distance window relative to the apparatus,
        wherein the threshold is dynamically updated over time based on observed interactions of the user with the output device.

2. The apparatus of claim 1, wherein the radar comprises a millimeter wave detection device that collects the position data on the user in a 180 degree span.

3. The apparatus of claim 1, wherein the output device comprises a monitor.

4. The apparatus of claim 3, wherein the setting comprises an amount of zoom of the monitor.

5. The apparatus of claim 1, wherein the output device comprises a speaker.

6. The apparatus of claim 5, wherein the setting comprises a volume of the speaker.

7. The apparatus of claim 6, wherein the threshold is associated with different directions such that when the user's head is pointed toward the output device, the processor automatically increases the volume of the speaker.

8. The apparatus of claim 1, wherein the memory is to store a plurality of user profiles, wherein the threshold for each one of the plurality of user profiles is different.

9. The apparatus of claim 1, wherein the setting of the output device is adjusted until the user is in a relaxed position, the relaxed position being a position of the user in which the user is sitting upright.

10. The apparatus of claim 1, wherein the distance window includes a first threshold indicating that the user is too close to the apparatus and a second threshold indicating that the user is too far from the apparatus.

11. The apparatus of claim 1, wherein the position data includes a plurality of position data points whose shape defines a posture of the user.

12. The apparatus of claim 11, wherein the plurality of position data points includes a first set of points above a line of a radar image generated by the radar and a second set of points below the line of the radar image, the first set of points corresponding to the user's head and the second set of points corresponding to the user's torso.

13. The apparatus of claim 11, wherein a width of the plurality of position data points defines an angle of the user relative to the apparatus.

14. A method, comprising:
    detecting a position of a user relative to a computing device via position data collected by a radar of the computing device;
    determining that the position of the user exceeds a threshold;
    adjusting a setting of an output device of the computing device based on the position of the user that is determined to exceed the threshold; and
    repeating the detecting, the determining, and the adjusting until the position of the user is within a distance window relative to the computing device,
    wherein the threshold is dynamically updated over time based on observed interactions of the user with the output device.

15. The method of claim 14, wherein the position comprises a distance from the computing device.

16. The method of claim 14, wherein the position comprises a direction and distance from the output device.

17. The method of claim 14, wherein the adjusting comprises:
    displaying on the output device a prompt to confirm that the user desired to adjust the setting; and
    updating the threshold based on confirmation received from the user.

18. A non-transitory computer-readable storage medium encoded with instructions executable by a processor, the non-transitory computer-readable storage medium comprising:
    instructions to establish a relaxed position relative to a computing device;
    instructions to collect position data of a user via a radar of the computing device;
    instructions to determine that a position of the user is outside of the relaxed position based on the position data; and
    instructions to adjust a setting of the computing device until the position of the user is in the relaxed position,
    wherein the relaxed position is within a distance threshold relative to the computing device, and
    wherein the distance threshold is dynamically updated over time based on observed interactions of the user with the computing device.

19. The non-transitory computer readable storage medium of claim 18, wherein the relaxed position comprises a predefined distance window relative to the computing device.

20. The non-transitory computer readable storage medium of claim 19, wherein the setting comprises a plurality of different settings based on a posture of the user detected based on the position data.

* * * * *